(12) United States Patent
Volmering et al.

(10) Patent No.: US 10,850,237 B2
(45) Date of Patent: Dec. 1, 2020

(54) METHOD FOR PRODUCING A MEMBRANE FILTER

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 48 days.

(21) Appl. No.: 16/236,421

(22) Filed: Dec. 29, 2018

(65) Prior Publication Data
US 2019/0209970 A1    Jul. 11, 2019

Related U.S. Application Data

(63) Continuation of application No. PCT/EP2017/065341, filed on Jun. 22, 2017.

(30) Foreign Application Priority Data

Jun. 30, 2016 (DE) .................. 10 2016 211 903

(51) Int. Cl.
  *B01D 63/02* (2006.01)
  *B01D 65/02* (2006.01)
  (Continued)

(52) U.S. Cl.
  CPC ......... *B01D 63/022* (2013.01); *B01D 63/026* (2013.01); *B01D 65/02* (2013.01);
  (Continued)

(58) Field of Classification Search
  CPC .. B01D 63/026; B01D 65/02; B01D 2313/21; B01D 2321/185; B01D 63/022; B29D 99/005; C02F 3/1268
  (Continued)

(56) References Cited

U.S. PATENT DOCUMENTS

3,730,959 A    5/1973  Horres, Jr. et al.
5,598,874 A  * 2/1997  Alei ..................... B01D 63/021
                                                                139/1 R
(Continued)

FOREIGN PATENT DOCUMENTS

DE      10227721 A1   1/2004
DE      29624474      3/2004
(Continued)

*Primary Examiner* — Philip C Tucker
*Assistant Examiner* — Vicki Wu
(74) *Attorney, Agent, or Firm* — Von Rohrscheidt Patents

(57) ABSTRACT

A method for producing a membrane filter for filtering a liquid, wherein the membrane filter includes at least one header and at least one membrane block that is connected with the at least one header, wherein the at least one membrane block includes multiple rows of hollow fiber membranes arranged substantially parallel to one another, wherein each of the hollow fiber membranes includes an open end that connects to a permeate chamber in the at least one header and a filtrate is pullable from the permeate chamber during operation of the membrane filter, wherein the at least one membrane block includes a spacer at a distance from the open end, wherein the spacer connects the hollow fiber membranes with one another and keeps them apart, and wherein the hollow fiber membranes are enveloped by a seal layer between the spacer and the open end.

12 Claims, 12 Drawing Sheets

(51) Int. Cl.
  *B29D 99/00* (2010.01)
  *C02F 3/12* (2006.01)
(52) U.S. Cl.
  CPC ........ *B29D 99/005* (2013.01); *B01D 2313/21* (2013.01); *B01D 2321/185* (2013.01); *C02F 3/1268* (2013.01)
(58) Field of Classification Search
  USPC .......................................................... 156/242
  See application file for complete search history.

(56) References Cited

U.S. PATENT DOCUMENTS

| | | | | |
|---|---|---|---|---|
| 2011/0031180 | A1* | 2/2011 | Tada | B01D 63/022 210/321.81 |
| 2014/0102971 | A1* | 4/2014 | Ahn | B01D 63/022 210/323.2 |

FOREIGN PATENT DOCUMENTS

| | | |
|---|---|---|
| DE | 102004004212 B4 | 8/2005 |
| DE | 102013017375 A1 | 4/2015 |
| DE | 102014219960 A1 | 4/2016 |
| WO | WO00/44483 | 8/2000 |
| WO | WO2015152401 A1 | 10/2015 |

* cited by examiner

METHOD FOR PRODUCING A MEMBRANE FILTER

RELATED APPLICATIONS

This application is a continuation of International application PCT/EP2017/065341 filed on Jun. 22, 2017 claiming priority from German Patent application DE 10 2016 211 903.6 filed on Jun. 30, 2016, both of which are incorporated in their entirety by this reference.

FIELD OF THE INVENTION

The invention relates to a method for producing a membrane filter for filtering a liquid.

BACKGROUND OF THE INVENTION

A method for producing a generic membrane filter of the generic type described supra is known from US 2001 003 7967A1.

According to the known method the membrane block is formed by layering individual layers of hollow fiber membranes on top of each other. Producing a layer is performed by initially placing a series of hollow fiber membranes with identical length adjacent to each other onto a surface that is coated with a layer of a material at which the glue does not adhere. The membranes are positioned with their ends at a distance from the strip. In the portion of the strip a layer of the glue with a width of 2-3 cm is applied from above onto the series of hollow fiber membranes. Thus, the hollow fibre membranes of the row are connected with each other. Thus, a layer of hollow fiber membranes is generated after curing the glue, wherein the row of hollow fiber membranes can be removed from the surface since the glue does not adhere to the surface due to the coated strip.

In the portion where the glue is applied a recess is fabricated in the surface so that the glue applied to the membranes moves from above through the spaces between the hollow fiber membranes into the recess and thus embeds the hollow filter membranes all around. Thus, cohesion of the hollow fiber membranes in the layer is improved.

Forming the membrane block is performed by stacking plural layers of hollow fiber membranes so that the cured spacers of the layers are positioned above one another during stacking and clamped together or glued together by additional glue. In both cases a membrane block with plural rows of hollow fiber membranes is generated wherein the hollow fiber membranes are enveloped at a distance from the open ends by a spacer that is made from the glue.

Before introducing the membrane block into the header, a gel layer is cast into the header. When introducing the membrane block the open ends of the hollow fiber membranes are dipped into the gel layer. Thus, the gel closes the open ends without creeping up on the outside of the hollow fiber membranes. Thereafter a casting material is applied to the gel layer wherein the casting material extends to the spacer. After curing the casting material to form the sealing layer the hollow fiber membranes are connected with the header by the sealing layer and fixed in the header. A permeate space is then generated in the membrane filter by removing the gel, wherein the permeate space adjoins the open ends of the hollow fiber membranes and liquid permeate is extracted through the permeate space during operation of the filter.

The hollow fiber membranes have a diameter of less than 5 mm, typically 0.5 to 3 mm and have a permeability of micro filtration membranes or ultra-filtration membranes. Using hollow fiber membranes for reverse osmosis or nano-filtration is also possible. Another method with the generic features recited supra is known from US 2014 010 297 A1.

WO 00/444483 proposes to wind the hollow fiber that comes endless from a membrane production arrangement in one layer onto a drum. After the drum is completely covered by the wound up membrane a glue strip is applied transversal to the membrane winding. After curing the glue strip the hollow fiber membranes that are wound onto the drum are cut parallel to an axial direction of the drum adjacent to the glue strip or exactly in its center, so that the hollow fiber membranes can be retrieved from the drum as finished layers. The hollow fiber membranes of an individual row are thus connected with each other in the finished layer by one or plural spacers made from glue.

DE 10 2004 00421 B4 discloses a method where the casting material is cast onto a spacer in a direction of the open ends of the hollow fiber membranes. In this case the spacer is produced as a separate component and subsequently equipped with hollow fiber membranes. While being equipped with the hollow fiber membranes the spacer is penetrated by the hollow fiber membranes. Thus, e.g. a perforated spacer configured as a perforated plate is described, wherein hollow fiber membranes that are cut to length are individually threaded through the perforations. Threading the hollow fiber membranes into the spacer, however, has proven to be a complicated process that can only be automated with a high level of complexity after threading the open ends of the hollow fiber membranes penetrate by a distance from the spacer and the ready equipped spacer is introduced into a header as a precisely fitting membrane block and sealed against the casting material. Thus, a casting cavity for the casting material is created that is defined by the header and the spacer into which the casting material is cast on the spacer.

Introducing the casting material in the portion of the hollow fiber membranes proximal to their ends in a direction towards the open ends is already described in the U.S. Pat. No. 3,730,959.

DE 10 2014 291 960 A1 and DE 10 2013 017 375 A1 propose to produce a membrane block for an air humidifier by folding a carrier foil that is covered with membranes on one side or on both sides.

Furthermore DE 102 27 721 A1 proposes a potting method without a seal layer.

In the known method handling the individual layers of hollow fiber membranes when stacking up to form the membrane block proves complex, in particular in view of the fact that the membranes typically have a length of more than 2 meters and are furthermore cast on both sides into a header. Additionally, stacking the individual layers on top of each other requires a precise positioning of the layers and of their spacers which can typically only be facilitated in a context of an automated production process by using complex and expensive robots.

BRIEF SUMMARY OF THE INVENTION

Thus, it is an object of the invention to automate production of a membrane filter in a cost effective manner.

The object is achieved by A method for producing a membrane filter for filtering a liquid, wherein the membrane filter includes at least one header and at least one membrane block that is connected with the at least one header, wherein the at least one membrane block includes multiple rows of hollow fiber membranes arranged substantially parallel to one another, wherein each of the hollow fiber membranes includes an open end that connects to a permeate chamber in the at least one header and a filtrate is pullable from the permeate chamber during operation of the membrane filter, wherein the at least one membrane block includes a spacer at a distance from the open end, wherein the spacer connects the hollow fiber membranes with one another and keeps them apart, and wherein the hollow fiber membranes are enveloped by a seal layer between the spacer and the open end, wherein the seal layer secures the hollow fiber membranes in the at least one header and seals the permeate chamber relative to the liquid, the method comprising the steps forming the at least one membrane block; introducing the at least one membrane block into the at least one header; introducing a liquid casting material between the spacer and the open end so that the casting material encloses the hollow fiber membranes; curing the casting material to form the seal layer; forming the at least one membrane block by applying a first layer of an adhesive to a surface to form a previously applied layer of the adhesive; thereafter repeating the following steps until all of the hollow fiber membranes of the at least one membrane block have been inserted: inserting the hollow fiber membranes of one of the rows into the previously applied layer of the adhesive, wherein the open end is positioned at a distance from the previously applied layer of the adhesive; applying another layer of the adhesive to the previously applied layer of the adhesive so that the inserted hollow fiber membranes are completely enveloped by the adhesive after being inserted into the adhesive; and curing the adhesive to form the spacer.

The method according to the invention completely omits the intermediary step of fabricating individual layers of hollow fiber membranes since the membrane block is directly formed in its entirety by stacking all rows with glue layers arranged there between. Thus, the entire handling of individual layers of hollow fiber membranes can be omitted which significantly simplifies the production process and its automation.

In membrane filters that are produced according to the method according to the invention typically the individual layers of the glue are visible at the liquid side exit locations of the hollow fiber membranes from the spacer, wherein the individual layers are only cured as an entire packet to form the spacer.

The glue that is cured to form the spacer can furthermore take over the function to softly embed the hollow fiber membranes in the transition portion of the exit from the fixation in the header into the entry of the liquid. Thus, the loading of the hollow fiber membranes at the clamping locations in the header is reduced which has a positive effect upon the service life of the membranes.

This is advantageous in particular in view of the use of the membrane filter in submerged operation in membrane bioreactors for waste water treatment. Thus, the membranes are intensively ventilated in order to flush the filters. The introduced air bubbles move the hollow fiber membranes and generate increased mechanical loading, in particular, at their clamping locations, this means in a transition portion from the liquid to the header where the hollow fiber membranes are fixed. Therefore, it is advantageous that the glue is a soft material after being cured to form the spacer.

Advantageously useable glues according to the method according to the invention therefore are e.g. silicones with a long processing time which are still very soft after the curing is performed by cross linking.

Epoxy resins are particularly suitable for the casting material that cures into the sealing layer.

According to the method according to the invention, the spacer is advantageously only made from glue. In low viscosity glues inserting the hollow fiber membranes into the glue and the subsequent application of another glue layer typically suffices to assure a complete wetting of the circumference of the hollow fiber membranes.

On the other hand, side, it is advantageous that the glue remains form stable as a layer when inserting the hollow fiber membranes. In order to facilitate this also additives for stabilizing the layers of glue, like, e.g. ribbons, strips or other materials can be introduced into the glue.

Alternatively, the form stability of the layers can be achieved in the method according to the invention by using highly viscous, pasty glues. In this case, it can be advantageous that the hollow fiber membranes are pressed down after being inserted into the glue, so that they dip into the glue at least partially. By being pressed down, it can also be assured for highly viscous and pasty glues that the hollow fiber membranes are wetted by the glue all around.

According to the method according to the invention it is furthermore advantageous when another glue layer is applied while the glue of the previously applied layer is still sticky, and the glue only cures to form the spacer after all hollow fiber membranes have been inserted. This creates a good connection and adhesion of the individual glue layers amongst each other, since the glue layers bond better with each other at their boundary surfaces.

Thus, it is an advantage of the method according to the invention that the hollow fiber membranes of a row can be inserted into the intermediary spaces of the hollow fiber membranes of the previously inserted row and pressed down. In order to achieve a uniform and high package density of the hollow fiber membranes in the membrane block, it is also possible that the hollow fiber membranes penetrate deeper into the glue with their bottom side than the top sides of the hollow fiber membranes of the previously inserted row. This is only possible in that the layers of the glue of the previously inserted row are still soft and sticky when inserting the hollow fiber membranes of the next row.

In an advantageous embodiment of the membrane filter that is produced according to the method according to the invention, the membranes of the individual rows are arranged so that they respectively penetrate into intermediary spaces of the hollow fiber membranes of the adjacent rows.

The penetration can thus also be performed far enough so that a distance of the rows measured by the distance of the planes that extend through the axes of the hollow fiber membranes in a row is smaller than the diameter of the membranes. In this case the distance between the surface to which the first layer of the glue is applied, and a tangent to the bottom side of the hollow fiber membranes of a row is smaller than the distance between the surface and the tangent to the topside of the membranes of the previously inserted row.

In one embodiment of the method according to the invention, the spacer is impermeable for the casting material and the casting material is cast onto the spacer. Thus, the spacer is introduced into the header in a sealing manner so that a casting cavity is created in a portion between the spacer and the open ends wherein the casting cavity is tight relative to the filled in casting material like a tub. The casting material is subsequently filled into the casting cavity and cast directly onto the spacer, while the open ends protrude from above out of the casting material. Thus, the necessity to use a gel according to the known method is removed wherein the open ends of the hollow fiber membranes are dipped into the gel which can be subsequently removed.

The casting material is thus typically only cast onto the spacer far enough so that the open ends of the hollow fiber membranes protrude from the cast layer of the casting material by approximately 5 to 20 mm. Thus, the method becomes less sensitive relative to fabrication induced length tolerances of the hollow fiber membranes in the portion of the open ends.

In an advantageous embodiment of the method according to the invention, the surface is an inside of an open shell that is closed after all hollow fiber membranes were inserted and the last layer of the glue was applied. After closing the shell the shell envelopes the glue with the inserted hollow fiber membranes. In this case not only the spacer with the inserted membranes but also the shell is part of the membrane block. Using the shell has the advantage that a waiting time until the cured spacer can be removed from the surface can be omitted. The glue remains on the inside of the shell until cured or beyond, this means it is not removed from the surface any more. By using the shell further processing or handling of the membrane block is independent from the curing time of the glue. It is another advantage of the shell that the shell is freely configurable with respect to its shape. Thus, the shell can be configured so that it is introducible into the header precisely fitting after closure. This can be performed, e.g., by a snap locking mechanism by which the shell is snap locked into the header. Furthermore, the shell can be configured so that it compresses the fibers more tightly on a side of the open ends in order to be able to introduce the membrane block into the header more easily.

In an advantageous embodiment of the method according to the invention, the shell is made from a skin and a cover that is separate from the skin, wherein the glue and the hollow fiber membranes are introduced into the skin and the cover subsequently closes the shell. The skin and the cover can be produced, e.g., as injection molded components.

In another advantageous embodiment of the method according to the invention, the shell is glued together with the header when introducing the membrane block into the header. In this case it is advantageous to configure the shell and the header from materials that can be glued together, like, e.g., PVC or ABS plastic materials. The gluing has the advantage that the joint of the shell and header is sealed relative to the liquid casting material.

In the context of this method according to the invention it is advantageous that the open ends protrude from the shell and protrude into the header, and that a joint between the header and the shell is embedded by the casting material. The joint between the shell and the header in this case mostly has the function to provide a casting space that is impermeable for the liquid casting material so that the casting solution can be poured onto the spacer. Fixing the hollow fiber membranes in the header and the sealing function between the permeate cavity and the liquid to be filtered is provided by the portion of the sealing layer in the header.

Another advantage of using a shell as a portion of the membrane block is that a thickness of the shell and thus a thickness of the wall of the membrane filter can be configured independently from the configuration of the header in the portion where the hollow fiber membranes exit from the header.

Since the header carries the weight of the membranes and is furthermore exposed to a continuous tension-compression load during filtration and back flushing operations, typically minimum requirements are placed upon the wall thicknesses of the header for strength reasons. However, thin wall thicknesses are advantageous for flow reasons in the portion of the exit of the hollow fiber membranes from the header since the low wall thicknesses bring the hollow fiber membranes closer to the flow cavity that envelopes the header which has a positive effect upon flushing the hollow fiber membranes.

When the wall that envelopes the membrane block in the portion of the exit of the hollow fiber membranes is part of the header, the hollow fiber membrane, however, can only be configured with thin walls within limits since only wall thicknesses can be implemented within an injection molded component that do not differ from each other excessively.

Through the configuration of the membrane filter with a shell, the wall thickness in the portion of the exit of the hollow fiber membranes is decoupled from the configuration of the header and can therefore also be very thin down to using foils for the shell. This leads to an improved flushing of the membranes by a flow that envelopes the header.

Thus, in an advantageous embodiment of the membrane filter that is produced according to the method according to the invention, the membrane block includes a shell that envelopes the spacer all around and that is introduced into the header.

In an alternative embodiment of the method according to the invention, a stabilizer ring is placed onto the closed shell and glued together therewith. In this case, also the stabilizer ring is part of the membrane block. It is an advantage of the stabilizer ring that it stabilizes the thin-walled shell. Additionally, using a separate stabilizer ring facilitates a precisely fitting configuration of the connector between the header and the membrane block.

It is advantageous to glue down the stabilizer ring as long as the glue of the last layer is still sticky. For example, when the shell according to the invention is made from a dish and a cover, a small amount of glue typically exits between the shell and the cover from the joint seam when closing the shell. When gluing down the reinforcement ring, typically the not-yet-cured exiting glue is covered by the glue seam of the stabilization ring. Thus, the glued-on stabilization ring already provides a membrane block with a defined clean and precise connection joint to the header in a non-cured condition of the glue.

In an advantageous embodiment of a method according to the invention, the stabilization ring is glued together with the header when introducing the membrane block into the header. Thus, also the joint between the header and the stabilization ring is tightly sealed relative to the liquid casting material.

In the context of the method according to the invention it is advantageous that the open ends protrude from the stabilizer ring and protrude into the header, and that the first joint between the header and the stabilizer ring and a second joint between the stabilizer ring and the jacket are embedded by the casting material. Also in this case the sealing layer alone provides sealing of the permeate cavity relative to the liquid to be filtered in the portion of the header. Thus, the first joint between the shell and the stabilizing ring and the second joint between the stabilizing ring and the header only have the function to provide a casting cavity that is impermeable for the liquid casting material.

In an advantageous embodiment of a membrane filter that is produced according to the method according to the invention, the membrane block therefore has a stabilization ring in addition to the shell that envelopes the spacer all around, wherein the stabilization ring is introduced into the header.

The method according to the invention can also be combined with the continuous production process of the hollow fiber membranes. Thus, the hollow fiber membranes are retrieved directly from a membrane production arrangement in order to be inserted into the glue. The membranes are typically produced continuously and in an endless manner. It is advantageous to provide a gripper at an end of the production arrangement wherein the gripper pulls the membranes from the arrangement and places them into the glue. After placement into the glue the membrane is cut to the desired length while a second gripper pulls the membrane further out of the production arrangement. In this type of coupling of membrane- and module production, it is important that the shell is open initially so that layers of the glue and the rows of the membranes can be placed therein.

Also when coupling the membrane and module production it is advantageous when the membranes are pressed down into the glue so that they dip into the glue at least partially. In the automated process, the pressing down can be performed by a down holder which presses the membranes into the glue down to the desired depth. Thus, the down holder can be configured so that it includes parallel grooves at its bottom side into which the membranes fit so that a uniform distance of the membranes in the row is assured during the down holding.

The method according to the invention can be used to produce membrane filters with only one header or optionally also to produce membrane filters with two headers. Additionally plural membrane blocks can be arranged in one header. A number of rows of membranes in a membrane block of a membrane filter that is produced according to the method according to the invention is typically between 3 and 9. The number of hollow fiber membranes in a row can thus amount to up to several hundred hollow fiber membranes. Depending on the curing time of the glue also several shorter rows with fewer hollow fiber membranes can be positioned within a plane adjacent to each other. Additionally the hollow fiber membranes can be inserted into the glue individually or several of them can be inserted simultaneously.

When implementing larger filter units, plural membrane filters that are produced according to the method according to the invention can be mounted on a common frame parallel and adjacent to each other. Thus, the permeate outlets of the individual membrane filters are connected with tubular conduits that are used to conduct the permeate out of the membrane filters.

When using the membrane filters in membrane bioreactors for waste water processing, the membrane filters additionally include a gas inlet. When jointly mounting plural membrane filters on a frame, also the gas inlets are connected with tubular conduits that are used to feed the gas into the membrane filters.

BRIEF DESCRIPTION OF THE DRAWINGS

The invention is subsequently described based on embodiments with reference to drawing figures, wherein.

DETAILED DESCRIPTION OF THE INVENTION

Figure 1A:
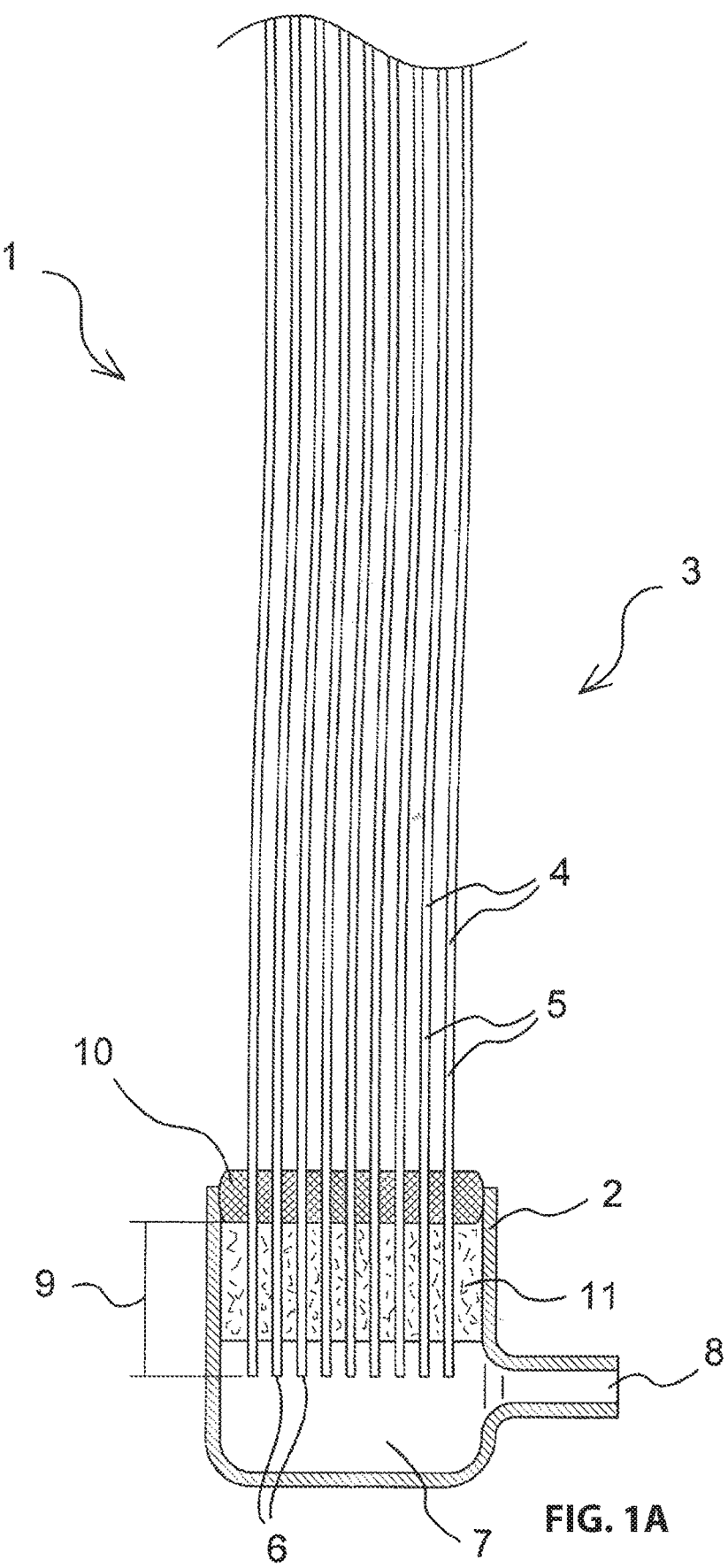
FIG. 1A illustrates a first membrane filter.

The drawing figures are schematic and not to scale. All non-stated details of subsequently described membrane filters and methods according to the invention are identical with embodiments of membrane filters and methods already described supra.

FIG. 1A schematically illustrates a sectional view of a first membrane filter 1 that is produced according to a first method according to the invention. The membrane filter 1 includes a header 2 at its bottom and a membrane block 3 that is connected with the header 2. The membrane block 3 includes plural rows 4 of hollow fiber membranes 5 that are arranged substantially parallel to each other. The hollow fiber membranes 5 have a length of two meters and a diameter of 2.6 mm. Each of the hollow fiber membranes 5 includes an open end 6 at a bottom, wherein the open end 6 adjoins a permeate cavity 7 in the header 2, wherein filtrate can be pulled from the permeate cavity 7 through a permeate outlet 8 during operations of the membrane filter 1. The membrane block 3 includes a spacer 10 at a distance 9 from the open ends 6 wherein the spacer connects the hollow fiber membranes 5 with each other. The hollow fiber membranes 5 are enveloped by a seal layer 11 between the spacer 10 and the open ends 6, wherein the seal layer fixes the hollow fiber membranes 5 in the header 2 and seals the permeate cavity 7 relative to the liquid.

Figure 1B:
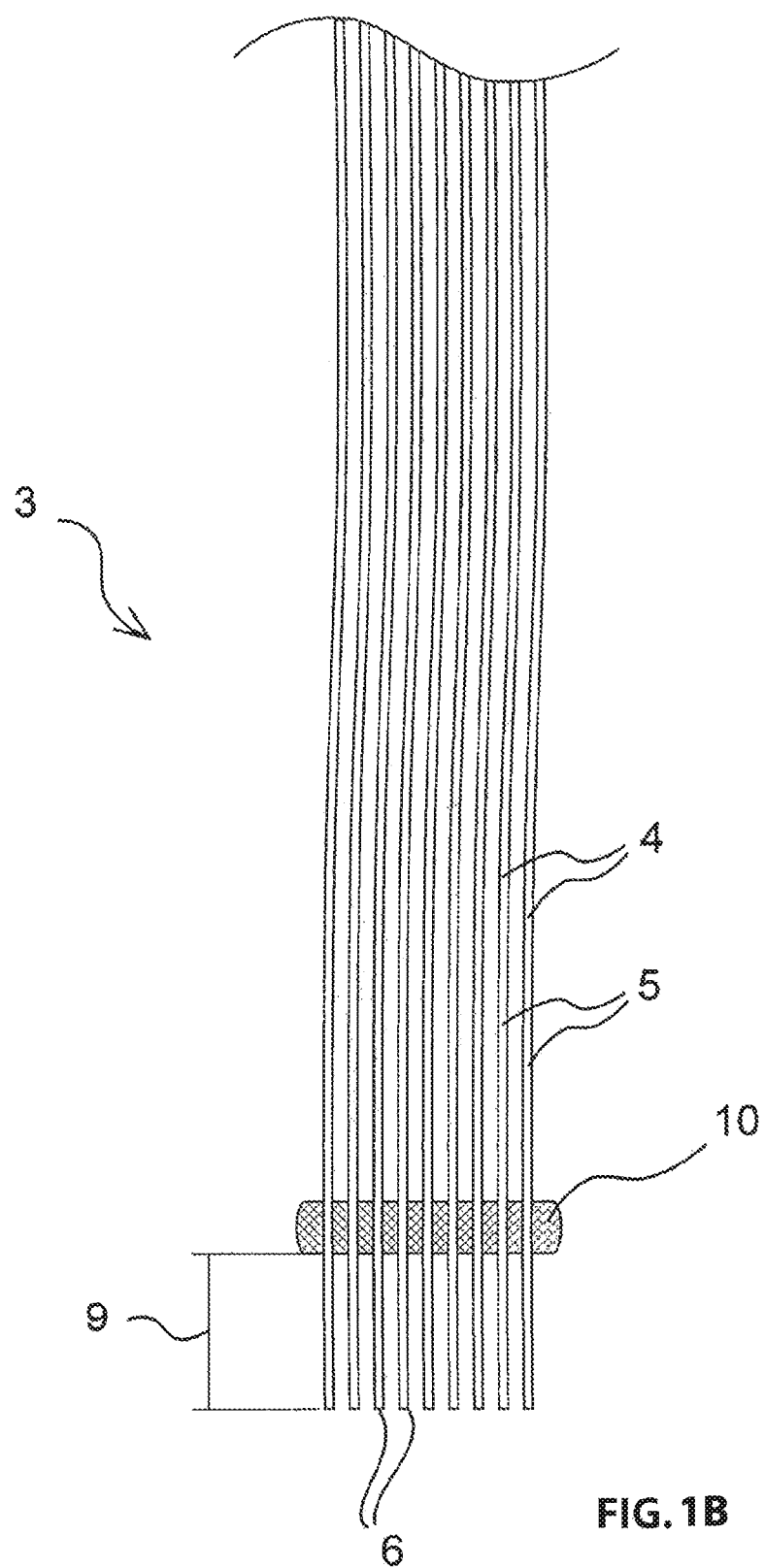
FIG. 1B illustrates a membrane block of the first membrane filter.

FIG. 1B schematically illustrates a sectional view of the membrane block 3 of the first membrane filter 1. The spacer 10 offsets the hollow fiber membranes 5 from each other and simultaneously connects them with each other. Only a lower portion of the hollow fiber membranes 5 is illustrated. The upper non-illustrated ends of the hollow fiber membranes 5 are also open and enveloped at a distance by a second spacer that fixates them in the same way in a second identical header, seals them and openly connects them at a second permeate cavity. Neither the second end of the membranes nor the second spacer, nor the second header are illustrated in the drawing figures.

Another non-illustrated embodiment is substantially identical with the first membrane filter but has no second upper header. The hollow fiber membranes 5 are individually closed in this embodiment and not fixed, this means they can move freely in the liquid to be filtered.

FIGS. 2A through 2H schematically illustrate steps for producing the first membrane filter 1. Thus, the details of producing the membrane block 3 are illustrated. Initially a first layer 12 of a glue 13 is applied to a surface 14. The surface 14 is not illustrated in the subsequent drawing figures. The glue 13 is a neutrally cross-linking, pasty silicon.

Figure 2A:
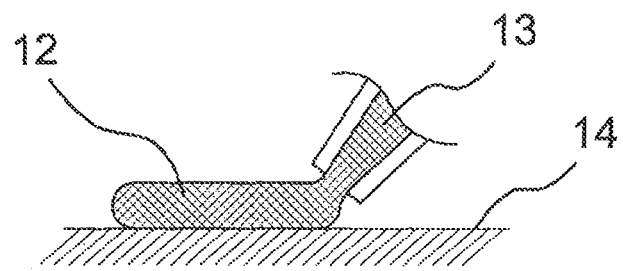
FIGS. 2A through 2H illustrate steps for producing the membrane block.
Figure 2B:
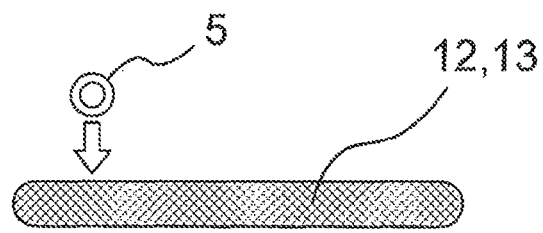
Figure 2C:
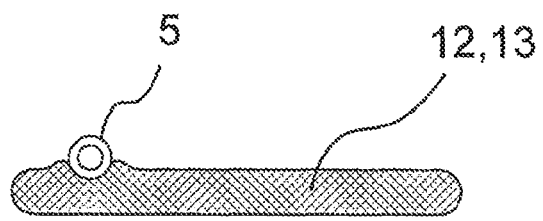

In FIGS. 2B and 2C a first hollow fiber membrane 5 is inserted into the first layer 12 of the glue 13.

Figure 2D:
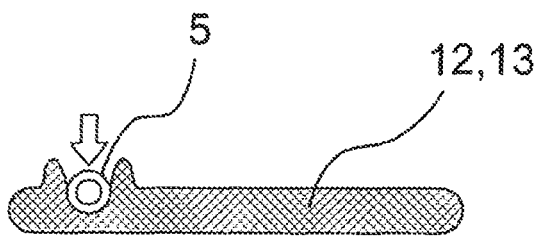

In FIG. 2D the first inserted hollow fiber membrane 5 is pressed down into the glue 13 so that the first inserted hollow fiber member dips by approximately 1.5 mm into the applied first layer 12 of the glue 13.

Figure 2E:
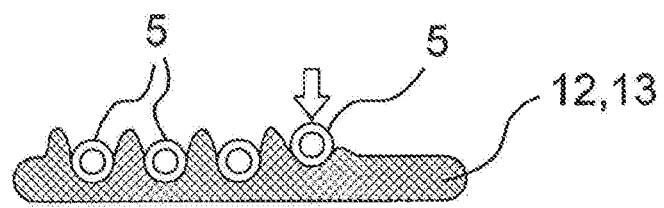

FIG. 2E illustrates how the additional hollow fiber membranes 5 are inserted into the first layer 12 of the glue 13 and pressed down. Thus, the hollow fiber membranes 5 are individually inserted into the glue 13 one after the other and then pressed down.

Figure 2F:
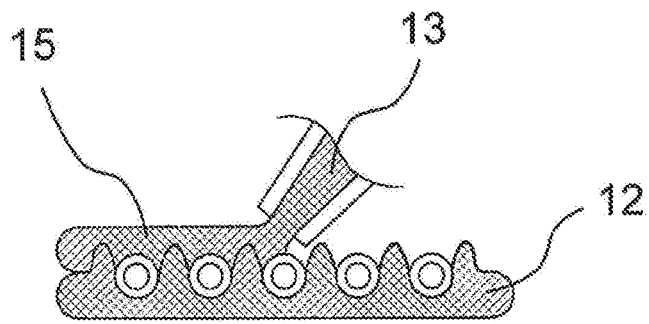

FIG. 2F illustrates the application of the second layer 15 of the glue 13 and the previously applied first layer 12 with five inserted hollow fiber membranes. Thus, the hollow fiber membranes 5 of the first layer 12 are enveloped by the glue 13 all around.

Figure 2G:
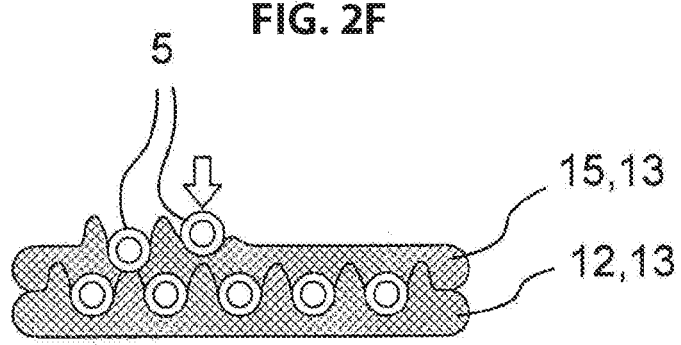

FIG. 2G illustrates the inserting and downward pressing of additional hollow fiber membranes 5 into the second layer 15 of the glue 13. Thus, the hollow fiber membranes 5 of the second layer 15 are respectively positioned in an intermediary space of the hollow fiber membranes 5 inserted into the first layer 12. The subsequent downward pressing of the hollow fiber membranes 5 is performed far enough so that a bottom side of the hollow fiber membranes 5 is positioned slightly lower in the second layer 15 than a topside of the hollow fiber membranes 5 that is inserted into the first layer 12.

Figure 2H:
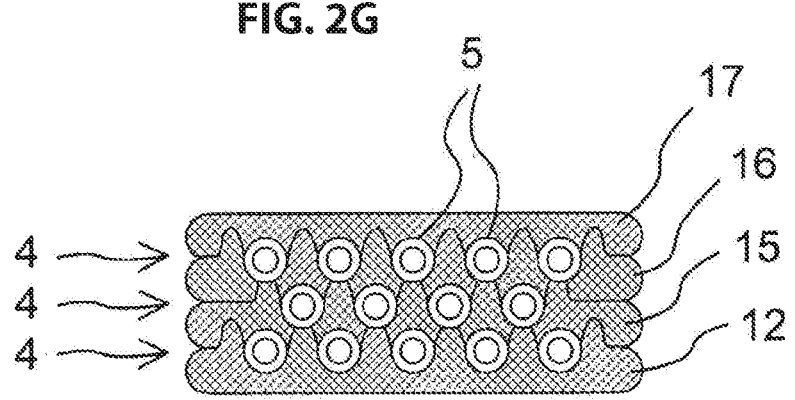

In FIG. 2H the membrane block 3 is illustrated with a third layer 16 and a fourth layer 17 of the glue 13. Three rows 4 of hollow fiber membranes 5 are inserted in the 4 layers (12, 15, 16, 17) of the glue 13. Inserting and depressing the hollow fiber membranes into the third layer 16 is thus performed in analogy to the procedure for the second layer 15. After applying all layers of the glue and inserting or depressing all hollow fiber membranes 5 of the membrane block 3, the glue 13 cures to form the spacer 10.

Figure 3:
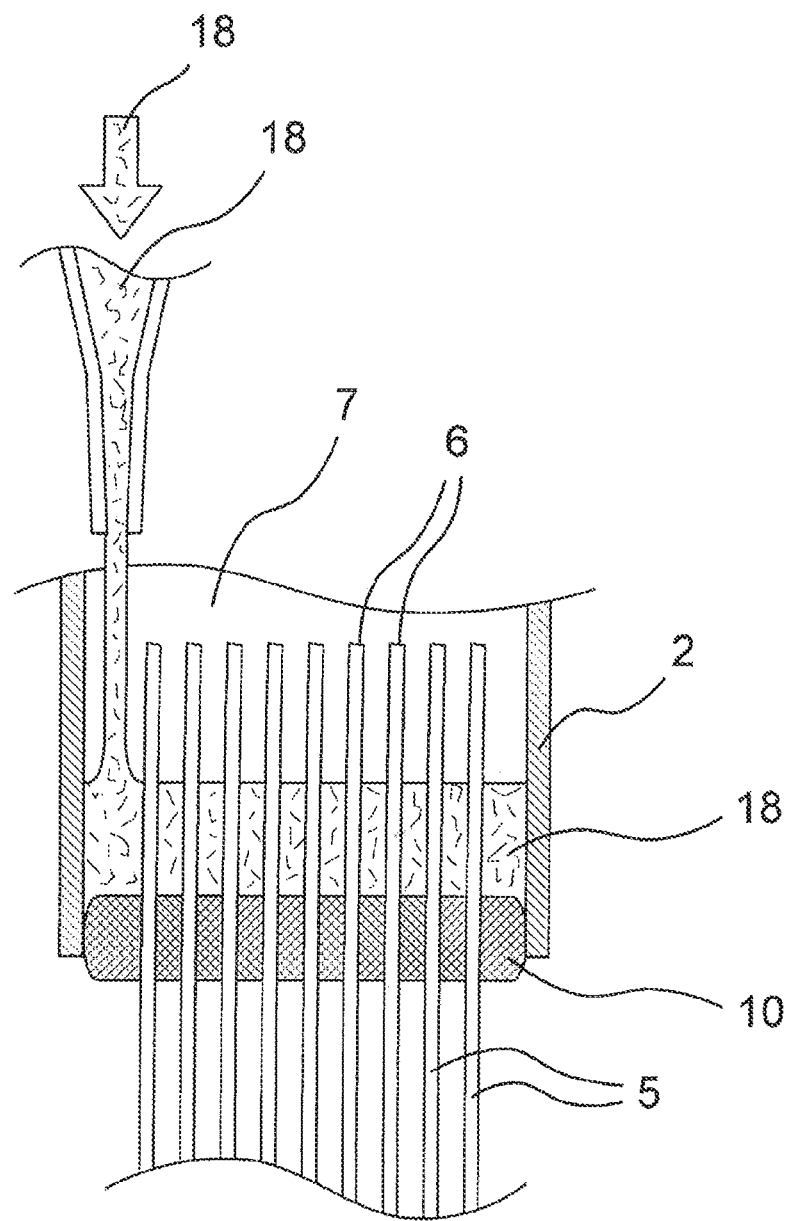
FIG. 3 illustrates a detail of producing the first membrane filter.

FIG. 3 illustrates another detail of the first method according to the invention where a casting material 18 is introduced between the spacer 10 and the open ends 6 of the hollow fiber membranes 5. Thus, the liquid casting material 18 is cast onto the spacer 10. The membrane block 3 was previously introduced into the header 2 so that the membrane block 3 forms a sealed tub for the casting material 18 together with the header 2. The casting material 18 fills the tub far enough so that the open ends 6 protrude from the layer of the casting material 18. After introducing the casting material 18, the casting material cures to form the seal layer 8 that fixes the hollow fiber membranes 5 in the header 2 and seals the permeate cavity 7 relative to the liquid. Thus, the casting material is an epoxy resin that is mixed from two components.

Figure 4A:
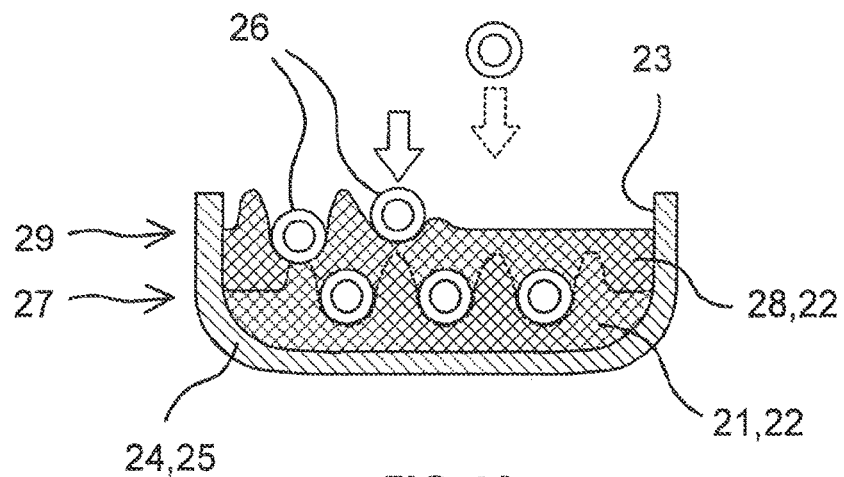
FIGS. 4A through 4C illustrate steps for producing a second membrane filter.
Figure 4B:
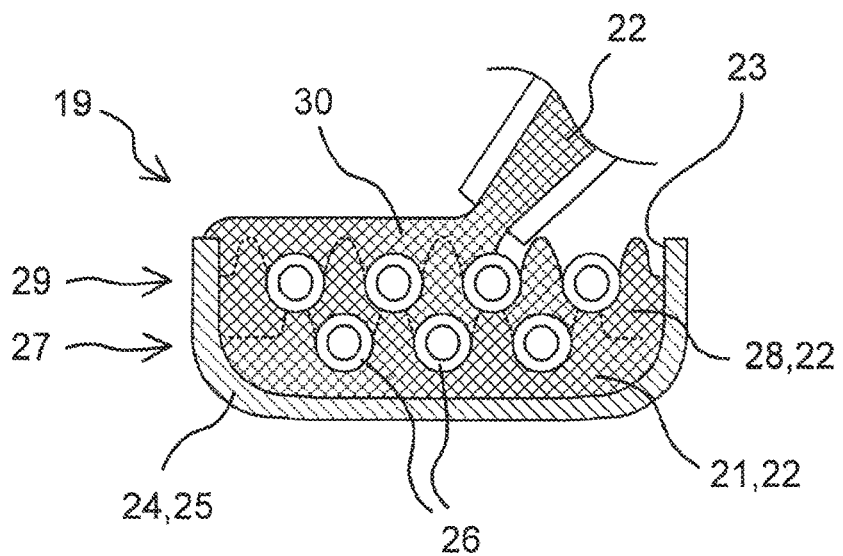
Figure 4C:
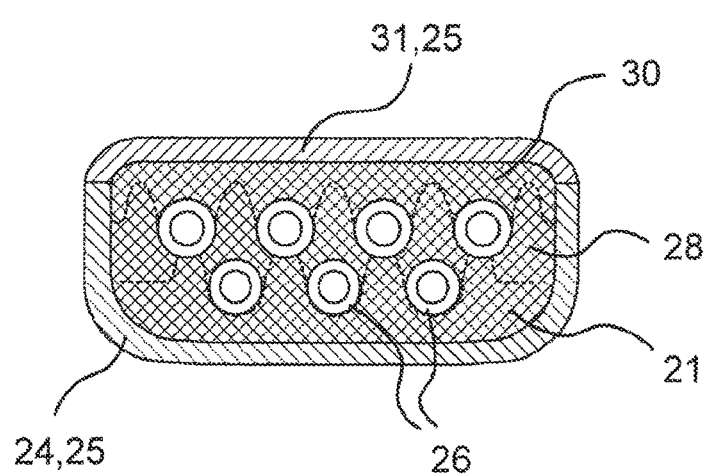

FIGS. 4A through 4c schematically illustrate detail steps to produce a membrane block 19 of a second membrane filter 20 according to the second method according to the invention. Thus, initially a first layer 21 of a glue 22 is applied to an inside 23 of an open shell 24 which is part of a skin 25. Hollow fiber membranes 26 are inserted into the first layer 21 and depressed thereafter. After all hollow fiber membranes 26 of a first row 27 of the hollow fiber membranes 26 are inserted, a second layer 28 of the glue 22 is applied to the first layer 21 so that the inserted hollow fiber membranes 26 of the first row 27 are encased by the glue 22 all around. Thus, the second layer 28 is adjacent with its sides to the inside 23 of the open shell 24. The hollow fiber membranes 26 of the second row 29 are inserted into the second layer 28 and pressed down thereafter.

FIG. 4B shows an application of a third layer 30 of the glue 22 onto the hollow fiber membranes 26 of the second row 29 that are inserted into the second layer 28 of the glue 22. The process of inserting and depressing the hollow fiber membranes 26 of a second row and the subsequent application of another layer of the glue are repeated until seven hollow fiber membranes 26 of the membrane block are inserted.

In other non-illustrated embodiments, the number of hollow fiber membranes per row and the number of rows in the membrane block differ from the schematic illustration shown herein. The number of the hollow fiber membranes in the individual rows can thus vary as well. This is the case in particular when the shell becomes wider in the upward direction. Thus, applying the glue and inserting the hollow fiber membranes is facilitated in the edge portion. Typically, the number of hollow fiber membranes per row is between 15 and 60 depending on a size of the membrane block.

FIG. 4c illustrates applying a cover 31 onto the last layer 30 of the glue 22. The cover 31 closes the skin 25. The closed skin 25 including the shell 24 and the applied cover 31 envelopes the layers (21, 28, 30) of the glue 22 and the hollow fiber membranes 26 inserted therein. After applying all layers (21, 28, 30) and inserting or depressing all hollow fiber membranes 26 the glue 22 cures to form the spacer.

The shell 24 and the cover 31 thus have a width of 3 cm and the layers of the glue 22 have a width of 2 cm.

Figure 5A:
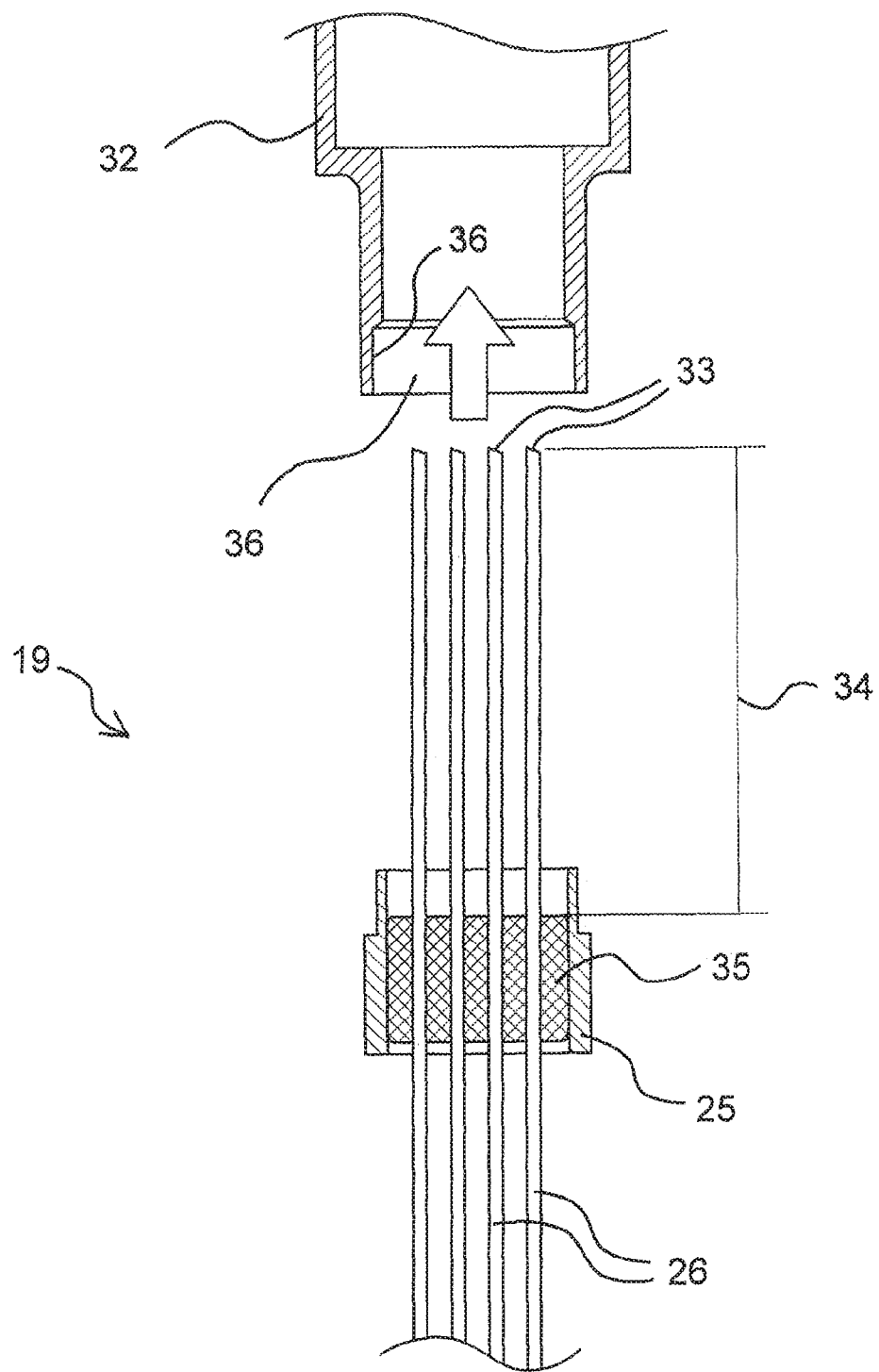
FIGS. 5A through 5B illustrate additional steps for producing the second membrane filter.
Figure 5B:
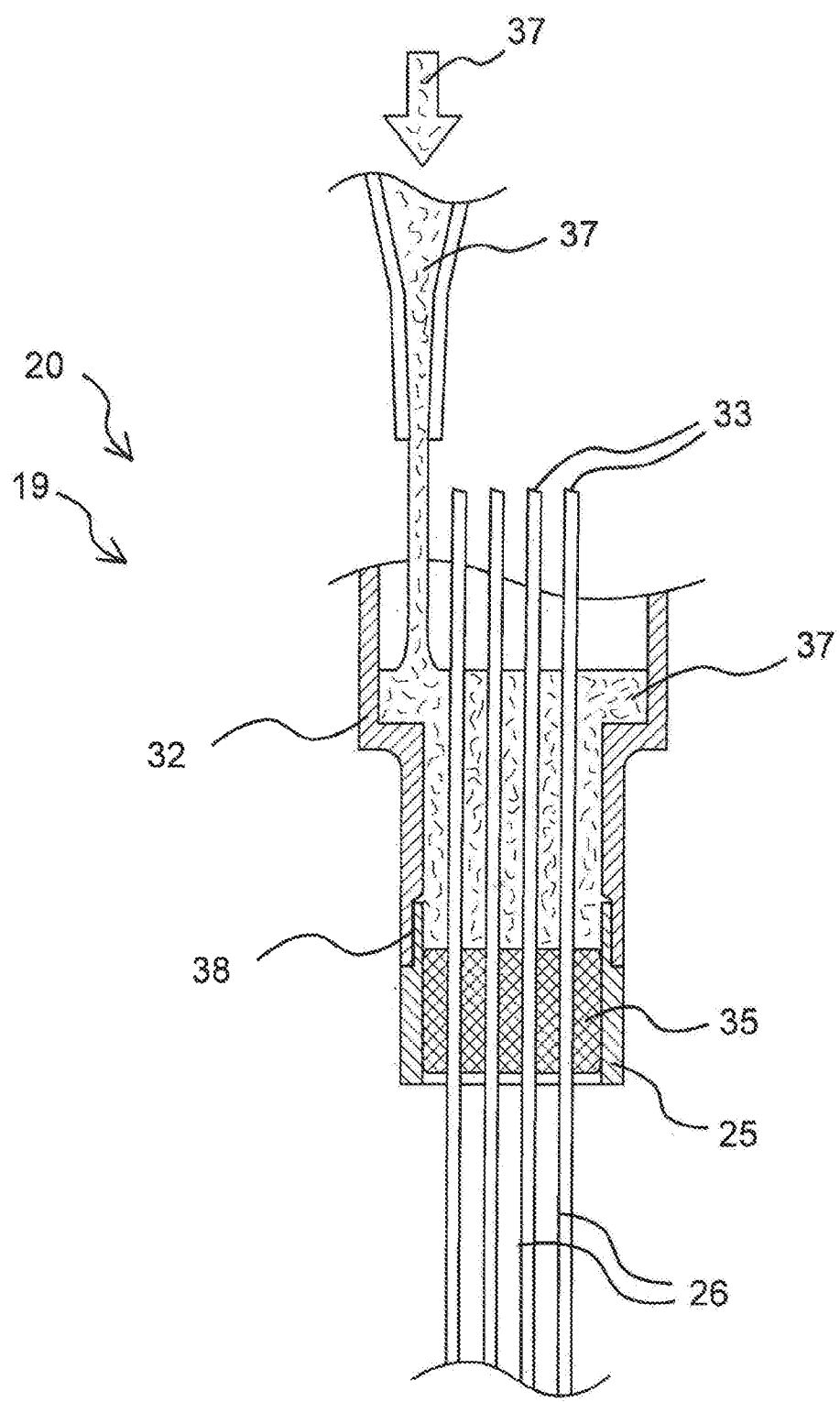

FIGS. 5A and 5B schematically illustrate additional steps for producing the second membrane filter 20. FIG. 5A initially illustrates introducing the membrane block 19 into a header 32. The membrane block 19 has plural rows of hollow fiber membranes 26 that have an open end 33 on one side. The non-illustrated end on the other side of the hollow fiber membranes 26 is individually closed and not fixed. At a distance 34 from the open ends 33 the membrane block 19 includes the spacer 35 which offsets the hollow fiber membranes 26 and connects them with each other. The spacer 35 is only made from the cured glue 22 into which the hollow fiber membranes 26 were inserted as long as the glue 22 was not cured. The spacer 35 and the hollow fiber membranes 26 in the membrane block 19 are enveloped by the closed skin 25 which fits precisely into an opening 36 of the header 32. A connecting agent is applied to the inside of the opening 36 in order to glue the skin 25 of the membrane block 19 together with the header 32.

FIG. 5B illustrates the membrane block 19 of the second membrane filter 20 that is glued together with the header 32 wherein a casting material 37 is cast on the spacer 35. Thus, the hollow fiber membranes 26 protrude from the skin 25 and simultaneously reach into the header 32. The joint 38 between the header 32 and the skin 25 is embedded by the casting material 37 and the hollow fiber membranes 26 are enveloped by the casting material 37 between the spacer 35 and the open ends 33. The casting material 37 is a two component epoxy resin. After curing the casting material 37 forms a seal layer that fixes the hollow fiber membranes 26 in the header 32.

FIGS. 6A-6d illustrate detail steps views for producing a third membrane filter 39 according to a third method according to the invention.

Figures 6A, 6B:
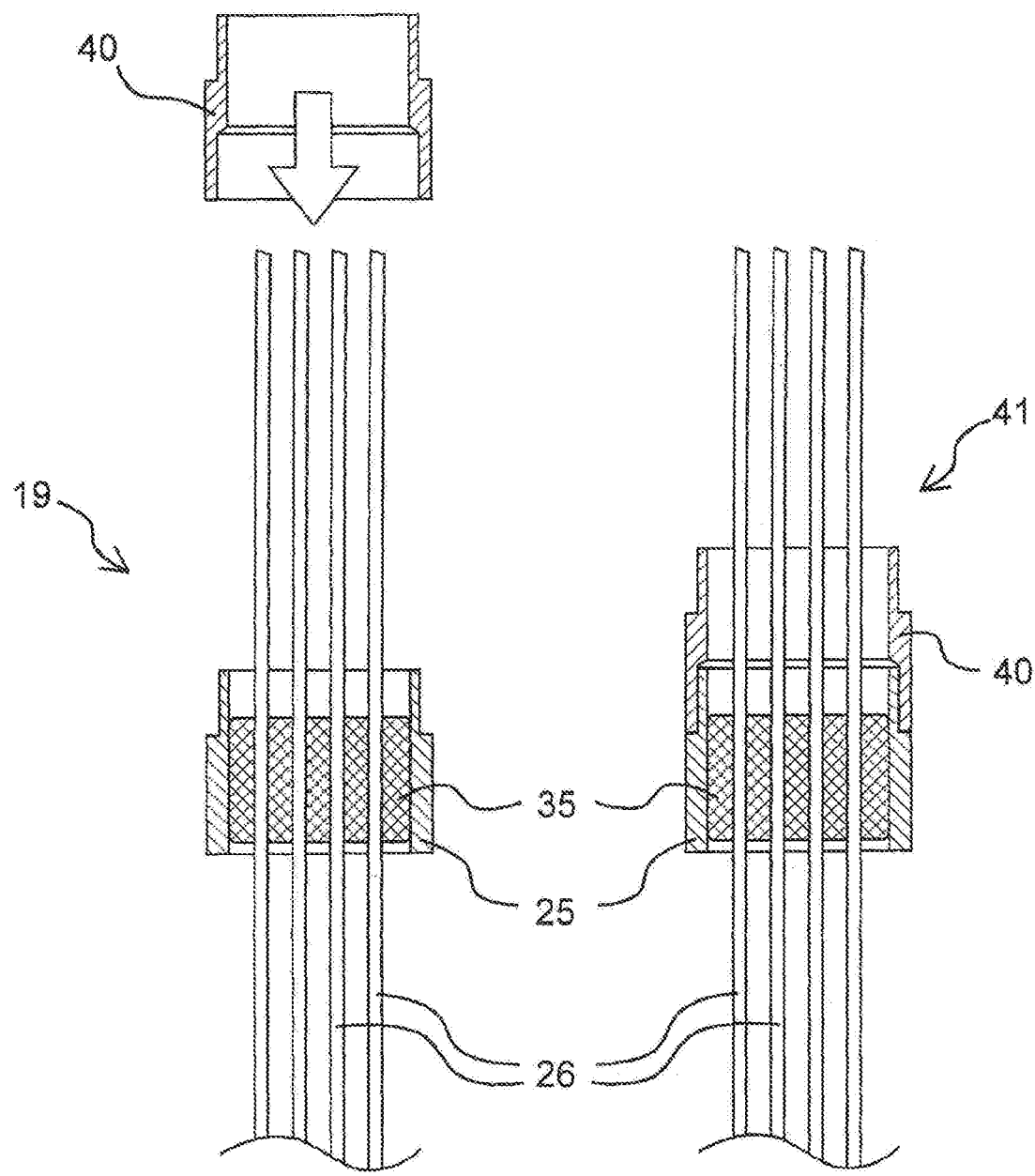
FIGS. 6A through 6D illustrate steps for producing a third membrane filter.

FIG. 6A illustrates a membrane block with hollow fiber membranes 26 and the spacer 35 that are enveloped by a skin 25 wherein the membrane block is identical with the membrane block 19 of the second membrane filter. A stabilizer ring 40 is slid onto the membrane block 19 and glued together with the skin 25.

FIG. 6B shows the membrane block 41 of the third membrane filter 39 with a glued down stabilizer ring 40 from which the open ends 33 of the hollow fiber membranes 26 protrude. In this case the stabilizer ring 40 is part of the membrane block 41.

Figure 6C:
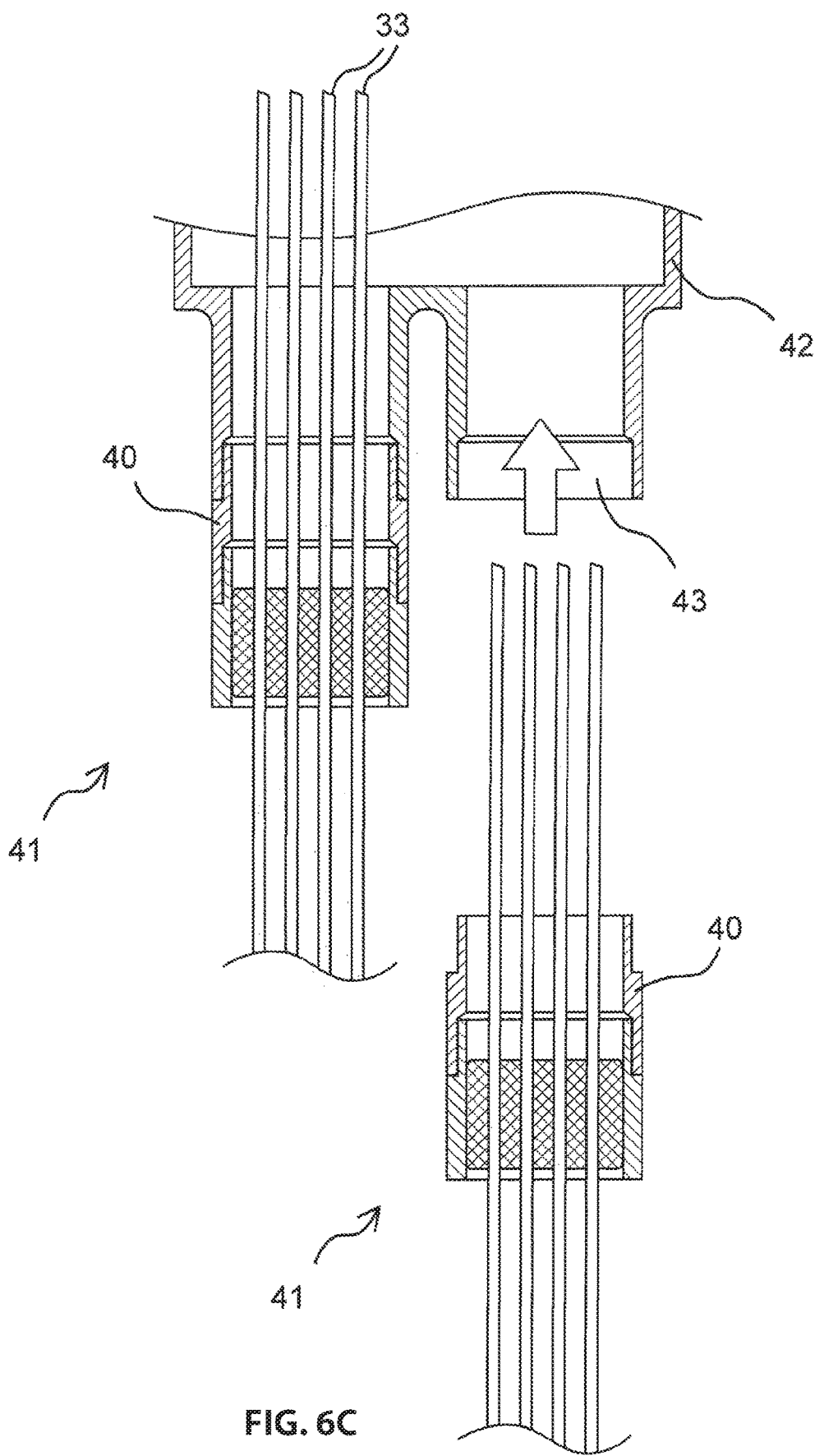

FIG. 6C illustrates introducing the 2 membrane blocks 41 into a header 42 of the membrane filter 39. Thus, the stabilizer ring 40 fits precisely into the provided openings 43 of the header 42. The open ends 33 protrude from the stabilizer ring 40. After introducing the membrane block 41 into the header 42 the open ends 33 protrude into the header 42.

Figure 6D:
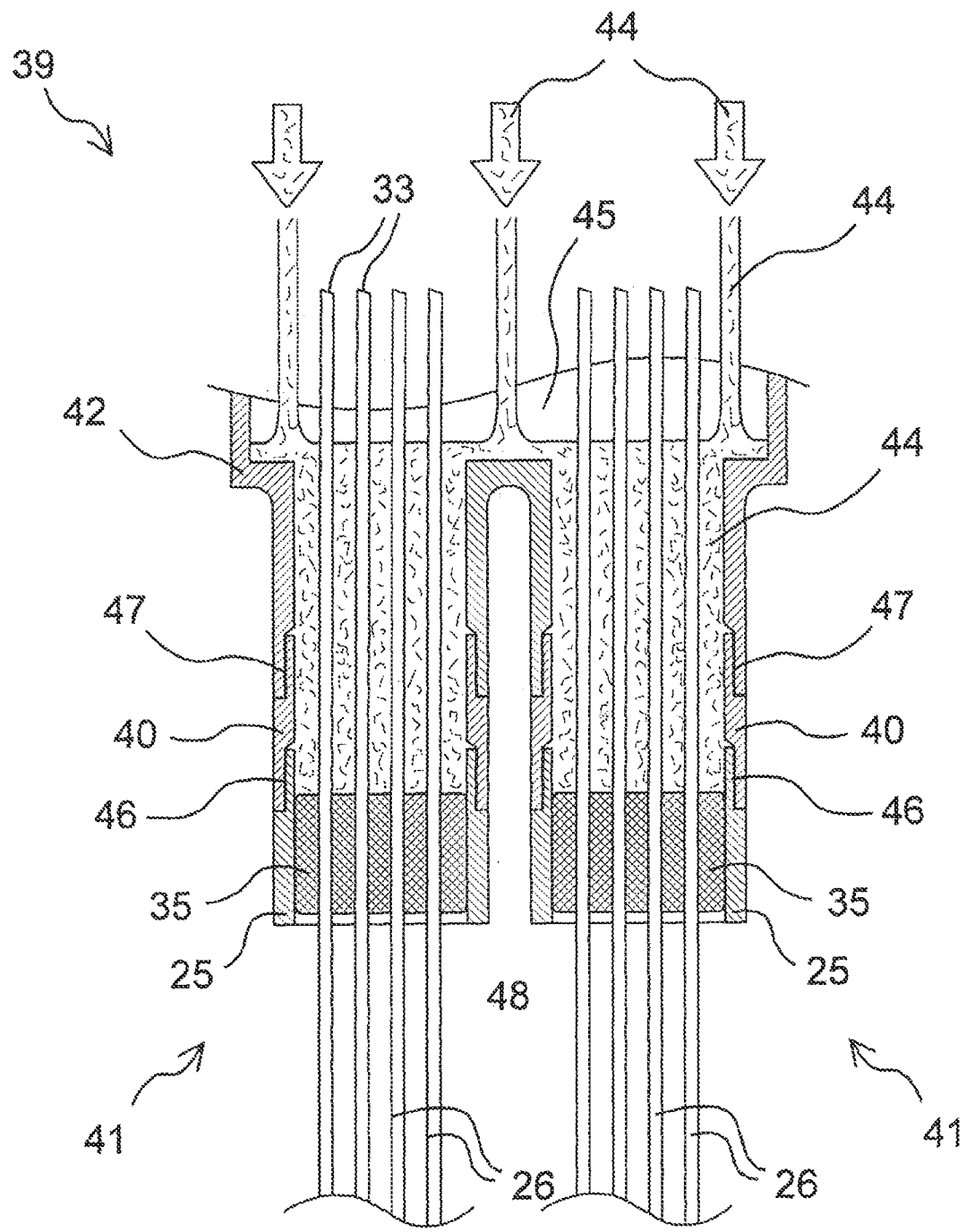

FIG. 6d illustrates introducing a liquid casting material 44 between the two spacers 35 and the open ends 33 of the hollow fiber membranes 26. The casting material 44 is a liquid resin that is cast onto the two spacers 35 from a permeate cavity 45 at three locations adjacent to the hollow fiber membranes 26. Thus, the casting material 44 embeds the first joint 46 between the skin 25 and the stabilizer ring 40 and the second joint 47 between the stabilizer ring 40 and the header 42. After the curing the casting material 44 into a seal layer the hollow fiber membranes 26 are fixed in the header and the permeate cavity 45 is sealed relative to the exterior space of the hollow fiber membranes 26 that is loaded by the liquid to be filtered. Filtrate can be extracted from the permeate cavity 45 during operations. Only a portion of the header is illustrated into which the membrane blocks 41 are inserted.

Figure 7:
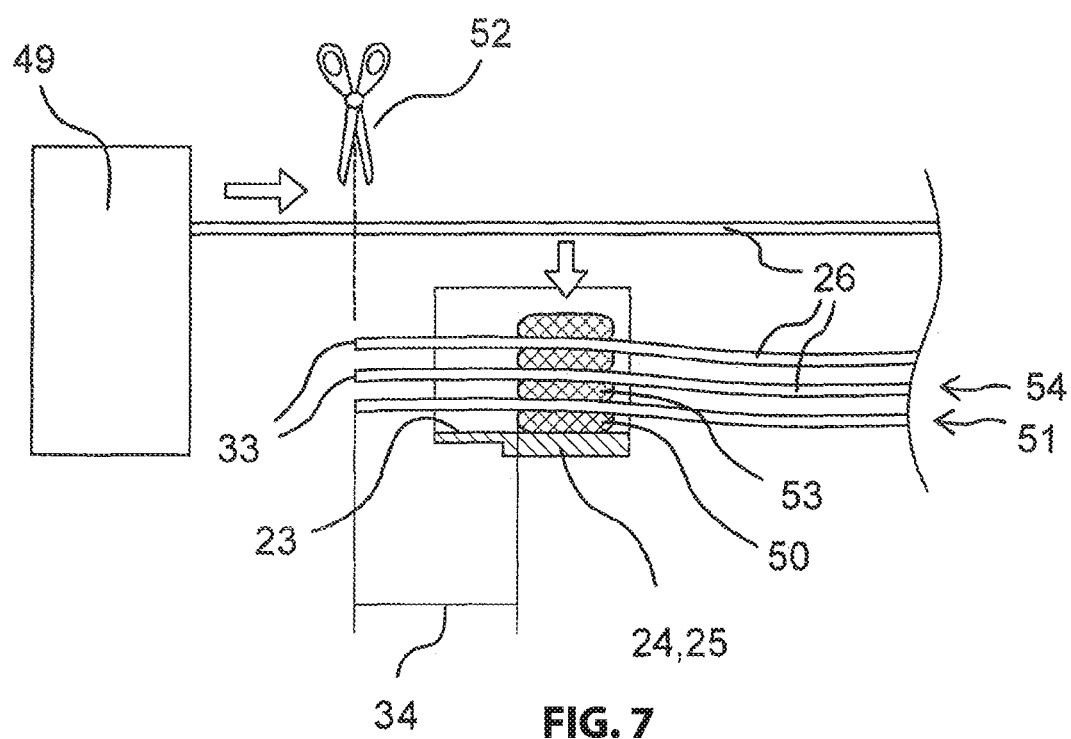
FIG. 7 illustrates a detail of producing the membrane block of the second membrane filter.

FIG. 7 illustrates details of a fourth method according to the invention wherein hollow fiber membranes 26 for automated production of the membrane block 19 of the second membrane filter 20 are directly retrieved from an arrangement 49 that is configured to produce membranes. The hollow fiber membranes 26 are pulled out of the arrangement 49 by a non-illustrated gripper. A shell 24 configured as an open skin 25 is placed on a non-illustrated slide wherein a first layer 50 of a glue 22 is applied to an inner surface 23. Thereafter a first row 51 of hollow fiber membranes 26 is embedded in the first layer 50 of the glue until all hollow fiber membranes 26 of the first row are inserted by repeating the following steps:

positioning the slide with the shell and the applied first layer 50 of the glue 22 below the hollow fiber membrane 26 that comes out of the arrangement 49;
  pulling the hollow fiber membrane 26 out by the gripper and subsequently holding the hollow fiber membranes 26 in the desired longitudinal position through the gripper.
  inserting the positioned hollow fiber membranes 26 into the previously applied layer 50 of the glue 22, and
  cutting the hollow fiber membranes 26 off using a cutting device 52 so that the open ends 33 of the hollow fiber membranes 26 are offset from the applied layer 50 of the glue 22 by the distance 34.

After all hollow fiber membranes 26 of the first row 51 are inserted an additional layer 53 of the glue 22 is applied into which the hollow fiber membranes 26 of an additional row 54 are inserted according to the procedure described for the first row 51. After all rows of hollow fiber membranes 26 are embedded in layers of the glue in this manner the skin 25 is closed by applying the non-illustrated cover 31 and the finished membrane block can be removed from the slide for further processing.

Figure 8:
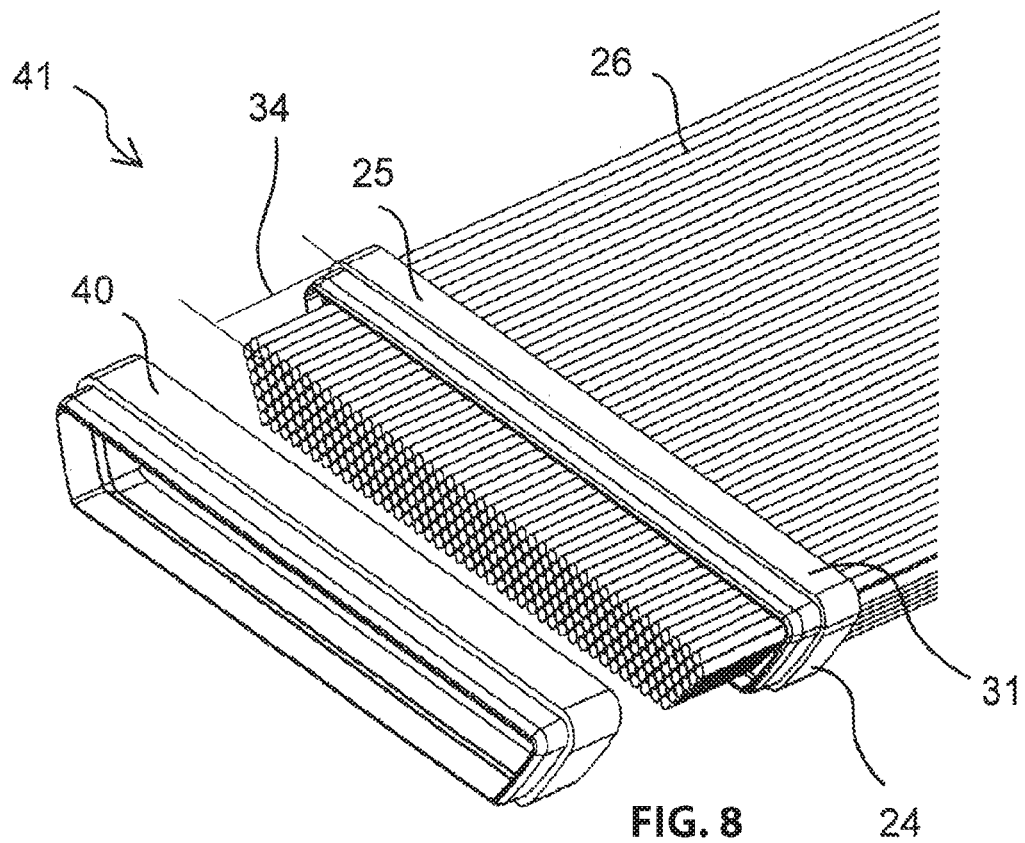
FIG. 8 illustrates details of the third membrane filter.

FIG. 8 illustrates details of the third membrane filter 39. Thus, hollow fiber membranes 26 are enveloped at a distance 34 by a spacer that is only made from glue and that is not visible since it is enveloped by a two piece skin 25. The skin 25 is made from a shell 24 and a cover 31 that is separate from the shell 24. A stabilizer ring 40 is slid onto the skin 25 and glued together with the skin 25. This way a membrane block 41 is generated that is inserted into the header 42 of the third membrane filter.

Another non-illustrated membrane filter is disclosed and described in DE 10 2013 218 188. It includes a membrane carrier configured as a portion of a base element wherein the base element forms the header in this embodiment. The membrane carrier includes fingers that are equipped with hollow fiber membranes 26. Six membrane blocks 41 are produced by the method according to the invention wherein the membrane blocks have outer contours with a circumference that corresponds to a size and shape of the fingers. The membrane blocks are glued into the disclosed base element from the permeate side and enclosed by a liquid resin. By curing the resin, the hollow fiber membranes 26 are fixed in the base element and the permeate cavity created in the base element is sealed relative to the outer cavity of the hollow fiber membranes 26 that are in contact with the liquid to be filtered.

REFERENCE NUMERALS AND DESIGNATIONS 1 membrane filter
2 header
3 membrane block
4 row
5 hollow fiber membrane
6 open end
7 permeate cavity
8 permeate outlet
9 distance
10 spacer
11 seal layer
12 first layer
13 glue
14 surface
15 second layer
16 third layer
17 fourth layer
18 casting material
19 membrane block
20 membrane filter
21 first layer
22 glue
23 inside
24 open shell
25 skin
26 hollow fiber membrane
27 first row
28 second layer
29 second row
30 third layer
31 cover
32 header
33 open end
34 distance
35 spacer
36 opening
37 casting material
38 joint
39 membrane filter
40 stabilizer ring
41 membrane block
42 header
43 opening
44 casting material
45 permeate cavity
46 first joint
47 second joint 48 exterior cavity
49 arrangement
50 first layer
51 first row
52 cutting device
53 additional layer
54 additional row

What is claimed is:

1. A method for producing a membrane filter for filtering a liquid,
  wherein the membrane filter includes at least one header and at least one membrane block that is connected with the at least one header,
  wherein the at least one membrane block includes multiple rows of hollow fiber membranes arranged substantially parallel to one another,
  wherein each of the hollow fiber membranes includes a respective open end that connects to a permeate chamber in the at least one header and a filtrate is pullable from the permeate chamber during operation of the membrane filter,
  wherein the at least one membrane block includes a spacer at a distance from the respective open end of the hollow fiber membranes, wherein the spacer connects the hollow fiber membranes with one another and keeps them apart, and
  wherein the hollow fiber membranes are enveloped by a seal layer between the spacer and the open end, wherein the seat layer secures the hollow fiber membranes in the at least one header and seals the permeate chamber relative to the liquid, the method comprising the steps:
  forming the at least one membrane block by initially applying a first layer of an adhesive to a surface to form a previously applied layer of the adhesive;
  thereafter repeating the following two steps until all of the hollow fiber membranes of the at least one membrane block have been inserted;
  inserting the hollow fiber membranes of one of the rows into the previously applied layer of the adhesive, wherein the respective open ends are positioned at a distance from the previously applied layer of the adhesive;
  applying another layer of the adhesive to the previously applied layer of the adhesive so that the inserted hollow fiber membranes of the one of the rows are in direct contact with the previously applied layer of the adhesive and the other layer of the adhesive and are circumferentially enveloped by the previously applied layer of the adhesive and the other layer of the adhesive so that the previously applied layer of the adhesive and the other layer of the adhesive are in direct contact with each other;
  curing the adhesive to form the spacer after all of the hollow fiber membranes of the at least one membrane block have been inserted into the adhesive;
  introducing the at least one membrane block with the spacer into the at least one header;
  introducing a casting material between the spacer and the respective open ends so that the casting material encloses the hollow fiber membranes;
  curing the casting material to form the seal layer.

2. The method according to claim 1, further comprising the step: depressing the hollow fiber membranes after being inserted into the adhesive so that the hollow fiber membranes dip into the adhesive at least partially.

3. The method according to claim 1, further comprising the step:
  applying when applying the another layer of the adhesive in the application step immediately following the insertion step of claim 1, specifically applying the said another layer while the adhesive of the previously applied layer is still sticky and only curing all layers of the adhesive to form the spacer after all hollow fiber membranes are inserted.

4. The method according to claim 1, wherein the spacer is impenetrable for the casting material and the casting material is cast onto the spacer.

5. The method according to claim 1, wherein the surface is formed by an inside of an open skin that is closed after all hollow fiber membranes are inserted.

6. The method according to claim 5,
  wherein the skin is made from a shell and a cover that is separate from the shell, and
  wherein the adhesive and the hollow fiber membranes are introduced into the shell and the cover subsequently closes the skin.

7. The method according to claim 5, further comprising the step: gluing the skin together with the at least one header after introducing the at least one membrane block into the at least one header.

8. The method according to claim 7, wherein the respective open ends of the hollow fiber membranes protrude from the skin and reach into the at least one header and a joint between the at least one header and the skin is embedded by the casting material.

9. The method according to claim 5, further comprising the step: sliding a stabilizer ring onto the skin and gluing the stabilizer ring together with the skin.

10. The method according to claim 9, further comprising the step: gluing the stabilizer ring together with the at least one header when introducing the at least one membrane block into the at least one header.

11. The method according to claim 10, wherein the open ends protrude from the stabilizer ring and reaches into the at least one header and a first joint between the at least one header and the stabilizer ring is embedded by the casting material and a second joint between the stabilizer ring and the skin is embedded by the casting material.

12. The method according to claim 1, further comprising the step: removing the hollow fiber membranes directly from an arrangement configured to produce the hollow fiber membranes before inserting the hollow fiber membranes into the adhesive.

* * * * *